US010924057B2

(12) United States Patent  
Stettenheim et al.

(10) Patent No.: US 10,924,057 B2
(45) Date of Patent: Feb. 16, 2021

(54) SNOW SHEDDING APPARATUS AND METHOD OF USING SAME

(71) Applicant: Norwich Technologies, Inc., White River Junction, VT (US)

(72) Inventors: Joel Stettenheim, Norwich, VT (US); Troy O. McBride, Norwich, VT (US); Leif Johnson, West Lebanon, NH (US)

(73) Assignee: NORWICH TECHNOLOGIES, INC., Norwich, VT (US)

(*) Notice: Subject to any disclaimer, the term of this patent is extended or adjusted under 35 U.S.C. 154(b) by 0 days.

(21) Appl. No.: 16/171,897

(22) Filed: Oct. 26, 2018

(65) Prior Publication Data

US 2019/0140585 A1   May 9, 2019

Related U.S. Application Data

(60) Provisional application No. 62/583,809, filed on Nov. 9, 2017.

(51) Int. Cl.
*H02S 40/12*   (2014.01)
*H02S 30/10*   (2014.01)

(52) U.S. Cl.
CPC .............. *H02S 40/12* (2014.12); *H02S 30/10* (2014.12)

(58) Field of Classification Search
None
See application file for complete search history.

(56) References Cited

U.S. PATENT DOCUMENTS

| | | | | |
|---|---|---|---|---|
| 2,198,186 | A | * | 4/1940 | Tinnerman ............... F16B 5/125 24/294 |
| 3,024,509 | A | * | 3/1962 | Hamann .................... F16B 5/06 24/453 |
| 2012/0137600 | A1 | * | 6/2012 | Jenkins ............... E04D 13/0481 52/173.3 |
| 2014/0041713 | A1 | * | 2/2014 | Adler ....................... H05B 3/26 136/251 |
| 2017/0370619 | A1 | * | 12/2017 | Matsuda ................. H02S 20/10 |

* cited by examiner

*Primary Examiner* — Magali P Slawski
(74) *Attorney, Agent, or Firm* — Joseph B. Milstein P.C.

(57) ABSTRACT

In snowy climates, photovoltaic panels suffer from significant losses due to snow accumulation. The present invention is a device that can be attached to a photovoltaic panel in order to promote snow sliding, increasing the power output of the panel as a result.

7 Claims, 15 Drawing Sheets

SNOW SHEDDING APPARATUS AND METHOD OF USING SAME

CROSS-REFERENCE TO RELATED APPLICATIONS

This application claims priority to and the benefit of U.S. provisional patent application Ser. No. 62/583,809, filed Nov. 9, 2017, which application is incorporated herein by reference in its entirety.

STATEMENT REGARDING FEDERALLY FUNDED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not Applicable.

FIELD OF THE INVENTION

The invention relates to a means of promoting snow shedding, for example by sliding, from photovoltaic (PV) systems in order to mitigate annual power output losses due to snow accumulation. Specifically, the invention relates to a device that can be attached to the frame of industry-standard PV modules, including those presently deployed in the field.

BACKGROUND OF THE INVENTION

Photovoltaic (PV) arrays in areas that receive significant annual snowfall are subject to power loss due to snow accumulation. On cold, sunny days following snowstorms, PV panels that are covered in snow produce little to no power despite ideal weather conditions for power production.

There is currently no reliable, scalable, cost effective method or product consistently used to clear snow from PV systems. This represents an unmet need in the solar industry in the temperate climate regions. Manufacturers and installers currently downplay the significance of losses due to snow and suggest that thermal properties of panels allow for rapid clearing. One approach to clearing snow is to "just wait and let it melt." Other sources advise system owners to either manually clear the panels themselves or hire someone to do it. Techniques advised include throwing tennis balls at panels, using a leaf blower, or using existing products like the Avalanche Roof Rake®. Hiring someone at a rate of $20/hour to clear a 1MW array (3000 modules) costs at least $1000 for a single snowfall event. This is not a cost-effective means of reducing losses due to snowfall.

There is a need for improved apparatus and methods for removing snow from solar collecting apparatus such as photovoltaic modules.

SUMMARY OF THE INVENTION

According to one aspect, the invention features a structure configured to be attached to a photovoltaic (PV) module; the structure comprising an element that extends from a frame of the PV module onto a surface of the PV module and having a first edge that sits flush against the surface without blocking any of the solar cells in the PV module; and the structure is configured to allow snow resting on the surface to overcome an impediment of the leading edge of the frame and to slide off the PV module.

In one embodiment, the structure is configured to allow manual attachment of the structure to the PV module.

In another embodiment, the structure comprises a snap-on attachment mechanism.

In yet another embodiment, the structure comprises a clamp-on attachment structure.

In one embodiment, the impediment is a step-like impediment.

In another aspect, the invention relates to a device, comprising: a structure that extends from a frame of a first photovoltaic (PV) module onto a surface of the first PV module and sits flush against the surface without blocking any of the solar cells in the first PV module; the structure is configured to fit within a gap between the first PV module and a second PV module installed adjacent to the first PV module; and the structure is configured to allow snow resting on the surface of the first PV module to overcome the impediment of the leading edge of the frame of the first PV module and to slide off the first PV module.

In one embodiment, the structure is configured to allow snow to traverse the gap between the first PV module and the second PV module.

In one embodiment, the structure is configured to allow manual attachment of the structure to the PV module.

In another embodiment, the structure comprises a snap-on attachment mechanism.

In one embodiment, the invention comprises two parts, a lower lip unit and an inter-panel connector.

According to one aspect, the lower lip unit attaches to the bottom frame of at least one photovoltaic (PV) module and allows snow to slide off the PV module.

According to another aspect, the invention relates to an inter-panel connector, comprising: a structure that connects a first PV panel to a second PV panel and that is configured to allow motion of the snow from the first PV to affect the snow on the second PV panel.

In another embodiment, the invention comprises just one part which can be attached to a PV module and concurrently serve the roles of both the lower lip attachment and the inter-panel connector.

According to another aspect of the invention, the single unit has an attachment mechanism which allows for the mechanical attachment of the structure by hand onto a selected one of the lower frame or the upper frame of a PV module, wherein the structure can be attached to another module and is configured to fit within and span the gap between two PV modules installed adjacent to one another.

In yet another embodiment, the devices of the invention can be produced from UV treated plastics.

In a further embodiment, the invention relates to a system for mitigating snow cover on a PV array, comprising: the device to allow snow to slide off a PV module, and further comprising a deliberate snow removal element as an additional element, said deliberate snow removal element configured to promote the shedding of snow.

In some embodiments, the deliberate snow removal element is at least one of a surface treatment applied to a surface of a PV module, a heater and a mechanical vibration actuator, alone or in combination.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 10A is an image as captured and recorded by the image analysis system.

FIG. 10B is an image in which a number of PV panels (shown in lighter shade) have been identified.

DETAILED DESCRIPTION

Figure 1:
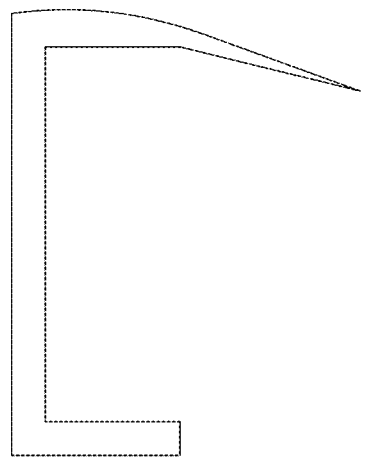
FIG. 1 shows a side view of an embodiment of a lower lip modification.

Norwich Technologies is developing a cost-effective, novel solution to reduce the losses due to snow accumulation on photovoltaic (PV) panels or PV modules. A solution to this problem represents a significant improvement to renewable energy. This device is preferably passive, inexpensive and easy to implement. The device will minimize the barrier created by the frame on PV modules and allow snow to slide off the module more rapidly and in a wider range of conditions than it is currently able to. The solution in some embodiments, is a device that is implemented on panel frames, comprised of a lower lip modification that allows snow to slide off a PV module, and onto the ground. This embodiment is useful for use on the lower edge of a panel that is closest to the ground, whether alone or as part of an array. The solution in some embodiments is a two-part device that is implemented on panel frames, comprised of a lower lip modification and an inter-panel connector. This embodiment is useful for allowing snow to slide from one panel to a lower panel. The frame can be fabricated from any convenient material that provides sufficient rigidity, such as aluminum or plastic, such as ABS plastic. In general, the PV modules are commercially available modules.

Photovoltaics is currently the largest market opportunity for solar, with 42.4GW of total installed capacity. See U.S. Solar Market Insight (Q4 2016), and U.S. Solar Market Insight (Q3 2018). Within the past decade, "nearly three-quarters of PV resources were installed in countries that experienced some amount of snowfall." See Andrews, Rob. W., Pollard, Andrew, & Pearce, Joshua M. (2013). The effects of snowfall on solar photovoltaic performance. Solar Energy, 92, 84-97. Snow can accumulate on panels, significantly reducing their power output by preventing sunlight from reaching the semiconductor material. Simulations from a site in Burlington, Vt. show that snow reduces annual power output by an average of 8.15%, with peak losses as high as 13.4%. See System Advisor Model (SAM) General Description (Version 2017.9.5) by NREL.

The snow shedding device is a passive solution, which is critical to ensuring it is a cost-effective means of minimizing snow losses. No extra energy beyond installation is required to implement the device. Once it has been attached to the module, it will remain functional over the rated 25-year lifespan of typical modules. It also does not reduce the amount of power the modules produce. No electricity-producing cells are covered by the device; it only covers the module frame.

Device prototypes have consistently demonstrated the ability to reduce the time required for snow to slide off of ground-mounted PV modules by up to 80%. This results in an average reduction in losses due to snow accumulation on PV systems of on the order of 50%.

In one embodiment, the invention comprises an attachment to the lower lip of modules, the lower lip modification, and an attachment that fits in between two modules on the frame, the inter-panel connector. The lower lip device hugs the panel frame and reaches onto the module surface, extending a short distance, for example, in some embodiments less than 1.905 cm (¾"), so that none of the power production cells are covered. The inter-panel device fits between two panels installed adjacent to one another.

Lower Lip Attachment

The lower lip attachment is a means of reducing the threshold inclination angle of the PV module in order for the snow to slide off of the module. Current modules typically include a gray or black aluminum frame that serves as an electrical ground and fits around the perimeter of the PV module. The lower lip attachment fits on top of the aluminum frame and includes a smooth curving surface from 0° to approximately 20° that extends approximately 2.54 cm (1″) over the surface of the panel. It leaves at least 1.27 cm (0.5″) between the leading edge and the edge of the bottom row of the solar cells.

The lower lip attachment employs a snap-on (or "slide-on" from one end) mechanism which anchors underneath the aluminum frame allowing the upper part to elastically bend over to top of the frame and secure the entire lower lip attachment to the PV module. In general, the device is capable of being manually installed.

FIG. 1 shows a side view of an embodiment of a lower lip modification. The modification's leading edge sits flush against the photovoltaic (PV) panel or PV module surface so that no water or ice can accumulate underneath the modification. The primary point of contact between the lip modification and the module is at the leading edge of the device so that compressive forces that hold the device in place also keep the device flush against the module.

Figure 2:
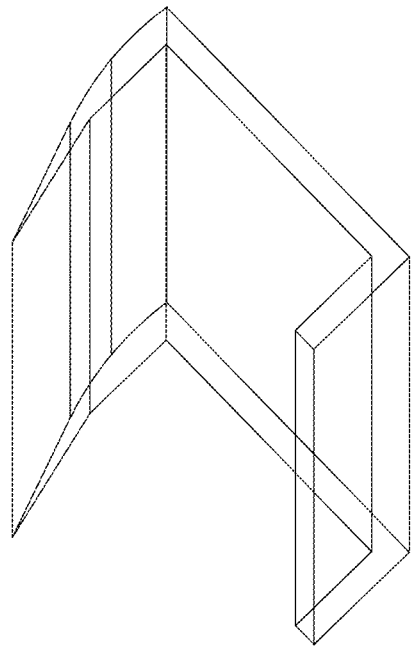
FIG. 2 shows a three-dimensional (3D) sketch of the lower lip modification of FIG. 1. This demonstrates how the device would fit snugly around the panel frame. The design can also include a small extrusion at the end of the piece that extends below the frame in order to secure the device for a long period of time.

FIG. 2 shows a three-dimensional (3D) sketch of the lower lip modification of FIG. 1. This demonstrates how the device would fit snugly around the panel frame. The design can also include a small extrusion at the end of the piece that extends below the frame in order to secure the device for a long period of time.

Figure 3A:
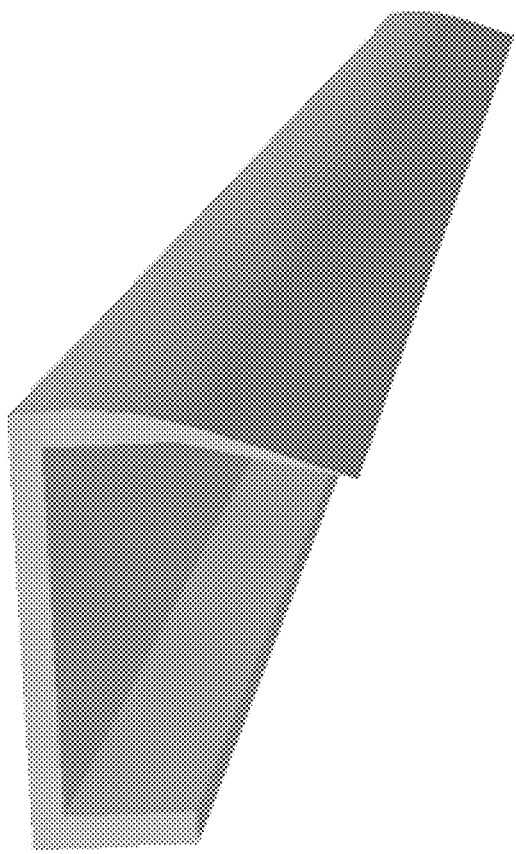
FIG. 3A shows a 3D rendering of a lower lip modification of FIG. 1.

FIG. 3A shows a 3D rendering of a lower lip modification of FIG. 1 that demonstrates the typical length of the device assuming a module installed in portrait orientation (e.g., with shorter edges at the top and bottom and longer edges on the sides, analogous to portrait orientation as used in printing a Word document). Landscape orientation is an orientation with shorter edges on the sides and longer edges at the top and bottom.

Figure 3B:
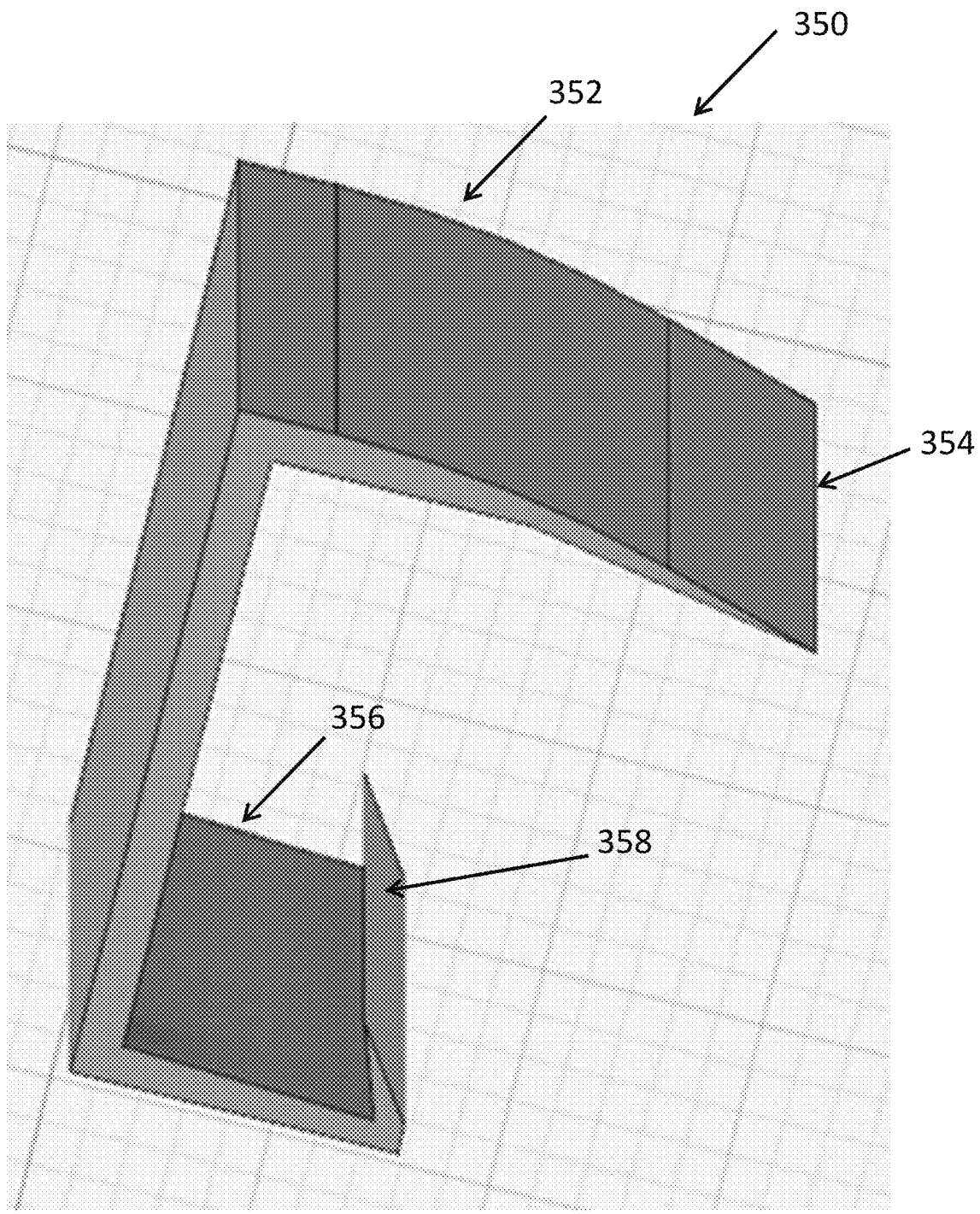
FIG. 3B illustrates an alternative 3D rendering of a lower lip modification of FIG. 1.

FIG. 3B illustrates an alternative 3D rendering of a lower lip modification of FIG. 1.

FIG. 3B illustrates an alternative 3D rendering of a lower lip modification 350 of FIG. 1. In FIG. 3B the Smooth surface 352 allows for easy sliding of snow at a starting angle of 20°. The fine tip 354 remains flush against the module surface. The bottom 356 holds the device 350 in place and flush vertically. The edge 358 allows for push-in implementation, after which the device is held in place both laterally and vertically.

It is advantageous that the lower lip attachment not void a PV panel warranty. In order to achieve that advantage one should preferably limit the means of adhesion, and that suggests that the lower lip attachment be a snap-on mechanism. The lower lip attachment should not be attached with glue or fasteners that require modification of the PV panel, such as cutting or drilling. It is advantageous that the lower lip attachment have a long service life, for example that it remain attached for 25 years. It is advantageous that the lower lip attachment have a low thermal expansion coefficient, so that temperature variations in the range of −30 C-45 C can be tolerated with minimal expansion/contraction of the lower lip attachment. It is advantageous that the lower lip attachment be able to be fit on multiple panel frames from different manufacturers, which can be accomplished either with a versatile device design or with several different designs for different panel frames.

Inter-Panel Connector

Modules that are arranged in more than one row vertically (on ground mount arrays 2-3 rows is typical) include a small gap in between the frames of adjacent modules. This is a distance recommended by the racking company. The gap between panels provides a seeding area for snow to accumulate and impedes sliding.

Figure 4:
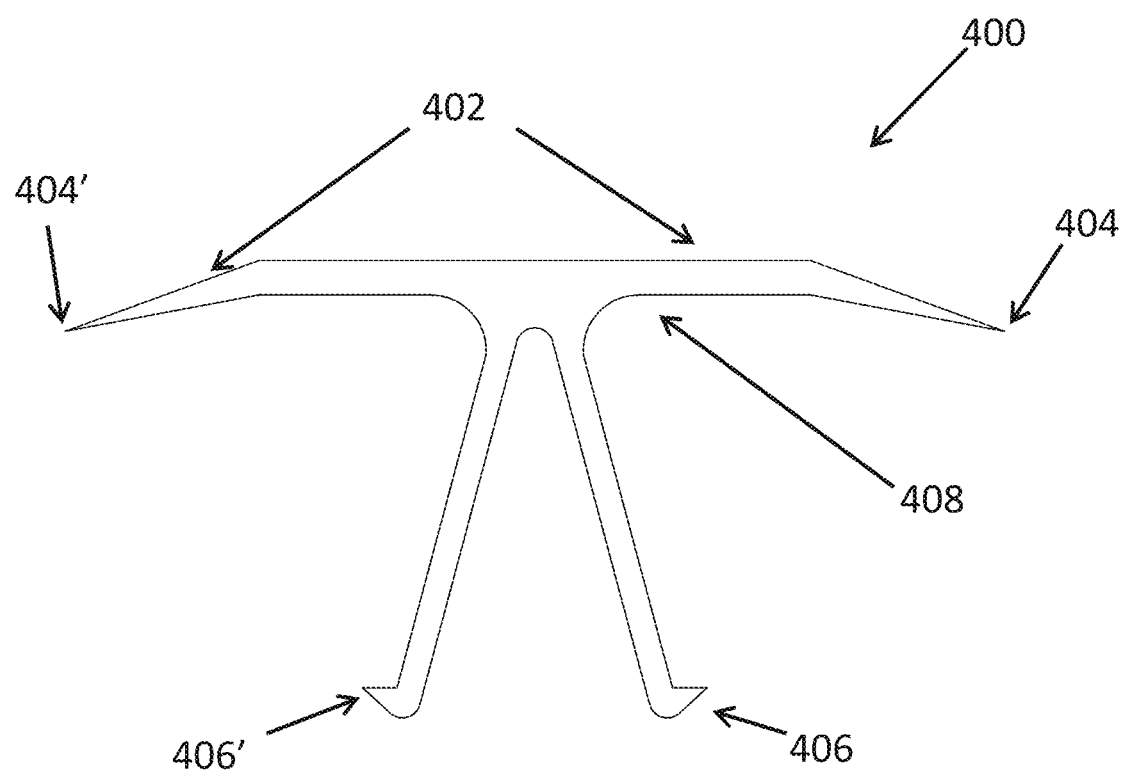
FIG. 4 shows a side view of an embodiment of an inter-panel connector.

FIG. 4 shows a side view of an embodiment 400 of an inter-panel connector. The leading edges are mirrored for both the upper panel leading edge and the lower panel leading edge. The edges sit flush against the surface. The device is held in place by a push-in mechanism that fits between the two modules and is secured by a small extension that extrudes underneath the frame.

The inter-panel connector design has a smooth top surface 402 that allows for easy sliding of snow, fine tips 404, 404' that remain flush against module surfaces, a bottom ledge 406 that allows for push-in implementation, in which the bottom piece snaps under the frame once it has been pushed in far enough, and a dimension 408 of the inter-panel connector that allows for slight gap between frame and interpanel piece so that downward force is focused at the tips of 404, 404' of the inter-panel connector to ensure it remains flush against the panels.

Figure 5:
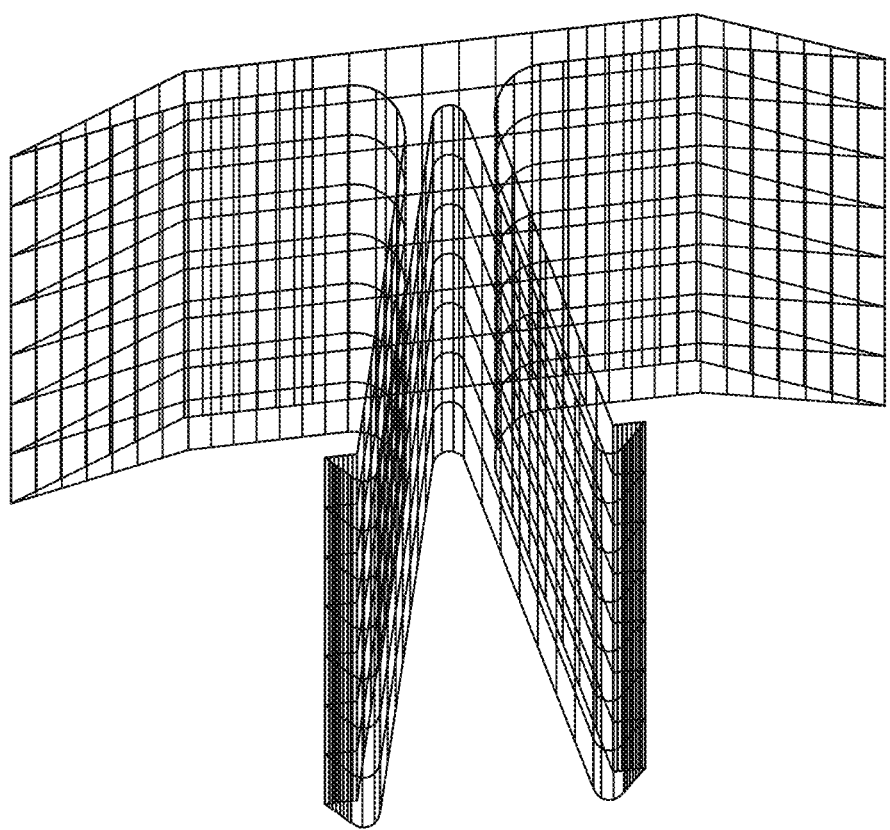
FIG. 5 shows a 3D sketch of the inter-panel connector of FIG. 4.

FIG. 5 shows a 3D sketch of the inter-panel connector of FIG. 4 and offers a more detailed look at the push-in mechanism of the device. The individual extensions that fit between the panel gaps allows for a gap size tolerance that will let the device comply with a range of racking assemblages and resulting installation error.

Figure 6:
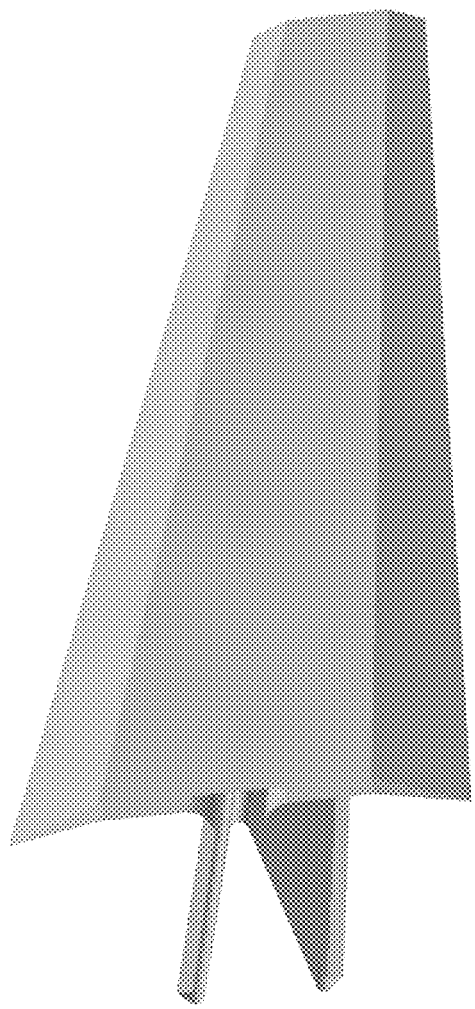
FIG. 6 shows a 3D rendering of the inter-panel connector of FIG. 4.

FIG. 6 shows a 3D rendering of the inter-panel connector of FIG. 4 that demonstrates the typical length of the device assuming a module installed in portrait orientation.

Figure 7:
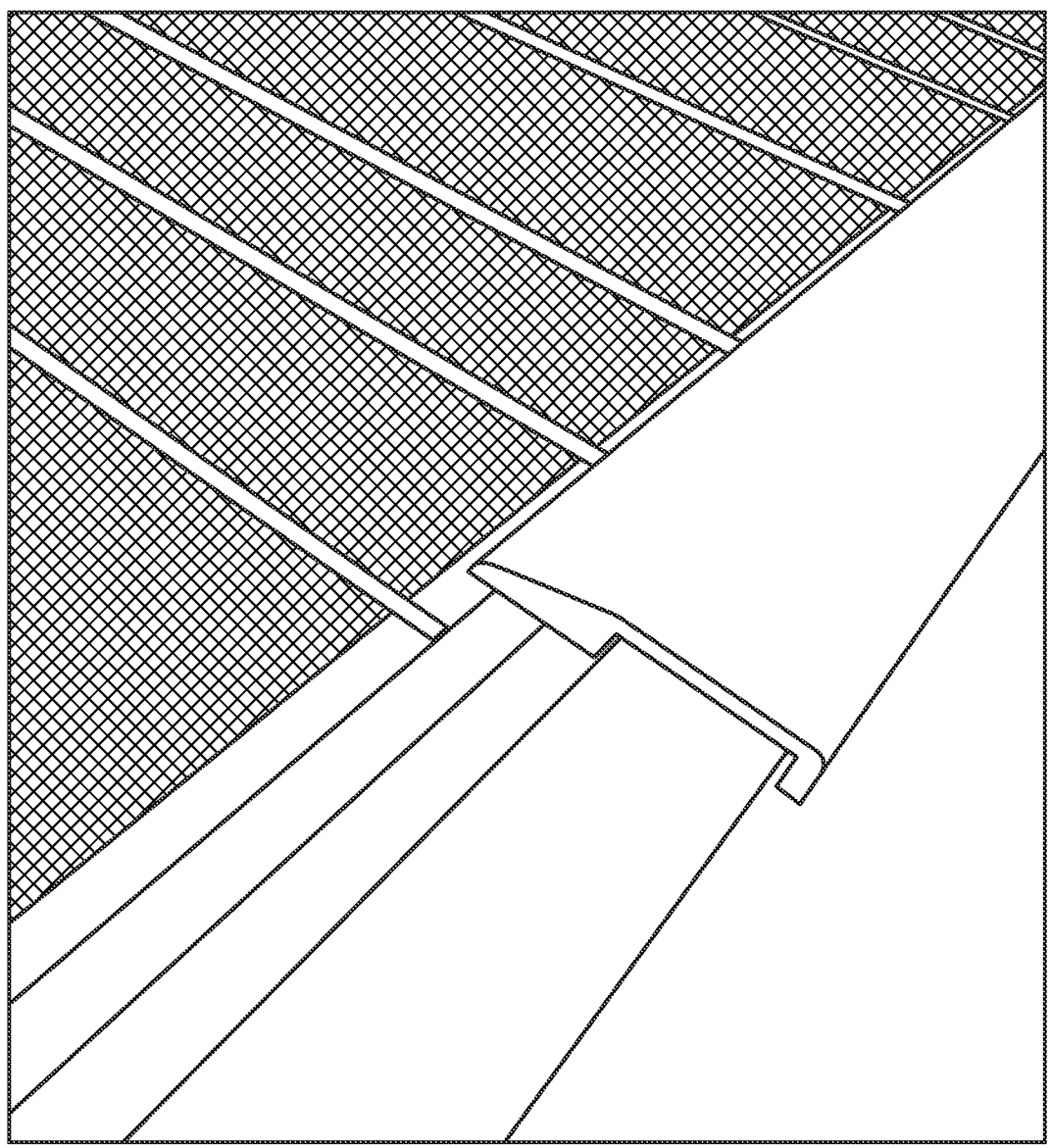
FIG. 7 shows a first-generation lower-lip modification prototype made of HDPE implemented on the middle section of a Solarworld Sunmodule® 275 W module.

FIG. 7 shows a first-generation lower-lip modification prototype made of HDPE implemented on the middle section of a Solarworld Sunmodule® 275 W module.

In one embodiment of the invention, the inter-panel connector fits in between this panel gap, bridging the space between panels and providing a surface over which snow can easily slide downwards. The connector sits flush against the upper panel's glass surface in a manner equivalent to the lower lip modification. It then extends down bridging the gap between panels. The lower edge of the connector can sit either on top of the frame of the lower panel or extend to the glass surface of the panel. The connector has two V-shaped extensions which initially are elastically bent inward as the connector is inserted into the inter-panel gap but then extend freely latching onto the bottom edges of the frames and securing the connector in place as the extremities are pushed beyond the thickness of the frames. In general, the device is capable of being manually installed.

In another embodiment, the invention comprises just one attachment which serves the roles of both the lower lip attachment and the inter-panel connector. In this case, the device is attached to the frame of the upper panel via the snap-on mechanism. The leading edge of the device sits flush with the glass surface of the panel allowing the snow to slide smoothly over the edge the panel frame. The trailing surface of the device, extend downward over the frame of the lower panel spanning the gap between the adjacent PV modules and allowing the snow slide continuously from the upper one to the lower one. The length of the trailing surface of the device is such that none of the power production cells are covered. In general, the device is capable of being manually installed.

The invention can be understood by analogy to avalanches that happen when snow accumulates on tilted surfaces. Just as a snow avalanche can occur when snow at the top of a tilted surface covered with snow becomes unstable, the shedding of snow from PV modules is expected to behave as a "mini-avalanche" if the snow on the modules can interact.

Figure 12A:
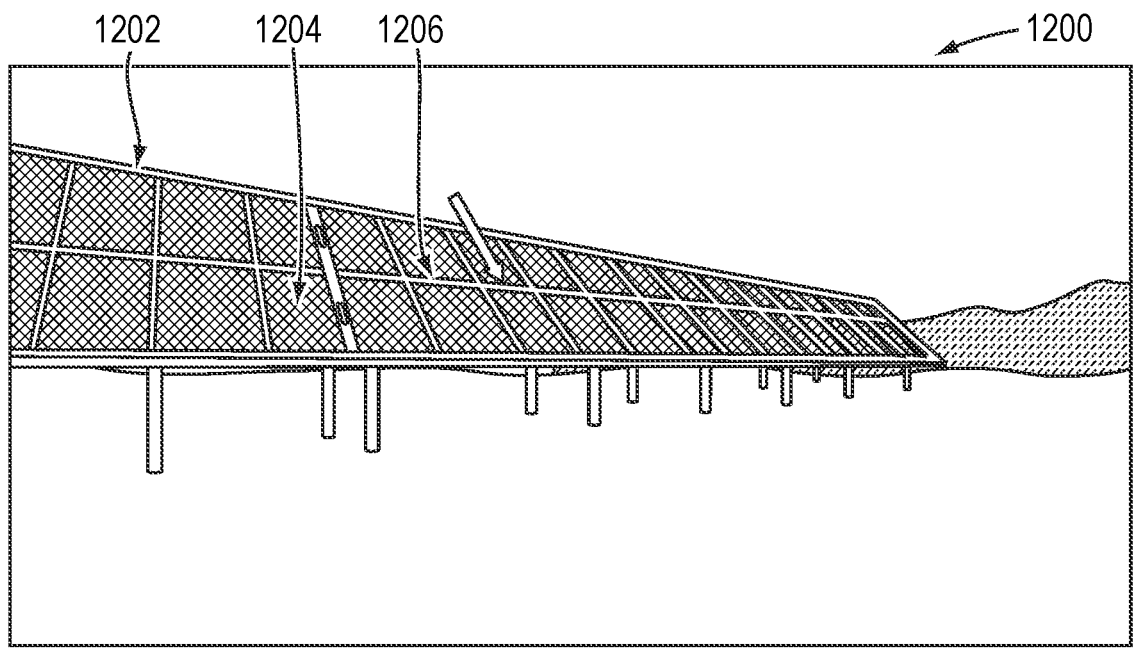
FIG. 12 A and FIG. 12B are captured images of PV panels, in which the arrow points to the metal strip at the edge of the PV panel.
FIG. 12C is an image of PV panels showing some panels covered partially or entirely by snow, and some panels not covered by snow.

A plurality of modules are connected by use of a gap-bridging device so that snow sliding off a first module that then passes onto a second module causes the snow resting on the surface of the second module to become unstable and to slide. This is expected to happen if the first and the second modules are oriented so that one is higher (in a gravitational field) than the other. In describing the first and second modules, one can refer to FIG. 12A, in which PV module 1202 and PV module 1204 are examples of first and second modules (in which either the upper PV module 1202 or the lower PV module 1204 is the "first module" and the remaining one of the upper PV module 1202 and the lower PV module 1204 is the "second module." Spacing 1206 illustrates the gap between PV panels installed in the orientation in which one is "higher" than the other (e.g., as illustrated the upper PV module 1202 is "higher" than the lower PV module 1204). In installations with more than two rows of modules, the "first" and "second" modules are modules adjacent to each other in neighboring rows.

It is also expected that snow on modules that are adjacent, and that may be at the same height in a gravitational field, may also cause a "mini-avalanche" on the adjacent module when the first starts to shed snow. Any instability may be sufficient to trigger such a "mini-avalanche", which can happen only if the snow on one module can interact with the snow on another, such as by providing motion across a gap-bridging structure It is advantageous if the inter-panel connector be able to fit on multiple racking designs, including accommodating a variation in recommended spacing between panels and/or a variation in installed spacing between panels. It is advantageous if the inter-panel connector have low thermal expansion coefficient. It is advantageous if the inter-panel connector be able to be implemented largely from ground level, be Lightweight, be capable of being manually pushed into a gap between panels, require no more than a step ladder to reach the gap between panels, and be able to be installed in under 120 seconds per device.

The devices of the invention can be produced from UV treated plastics. Examples of UV-treated materials include but are not limited to polycarbonate and polyvinyl chloride (PVC) plastics.

Cad Modeling

Figure 8A:
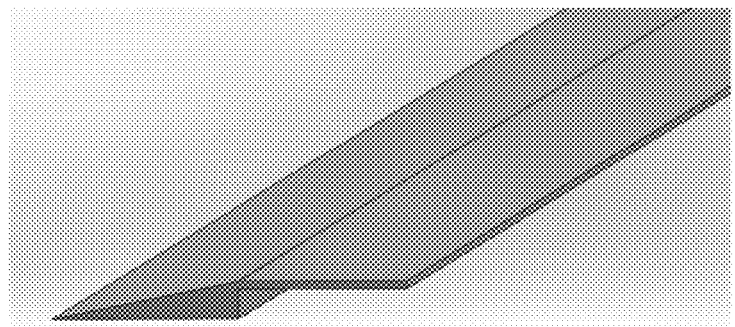
FIG. 8A shows a perspective view of a CAD model of the upper face of a first-generation device that sits flush against a panel or module surface.

FIG. 8A shows a perspective view of a CAD model of the upper face of a first-generation device that sits flush against a panel or module surface.

Figure 8B:
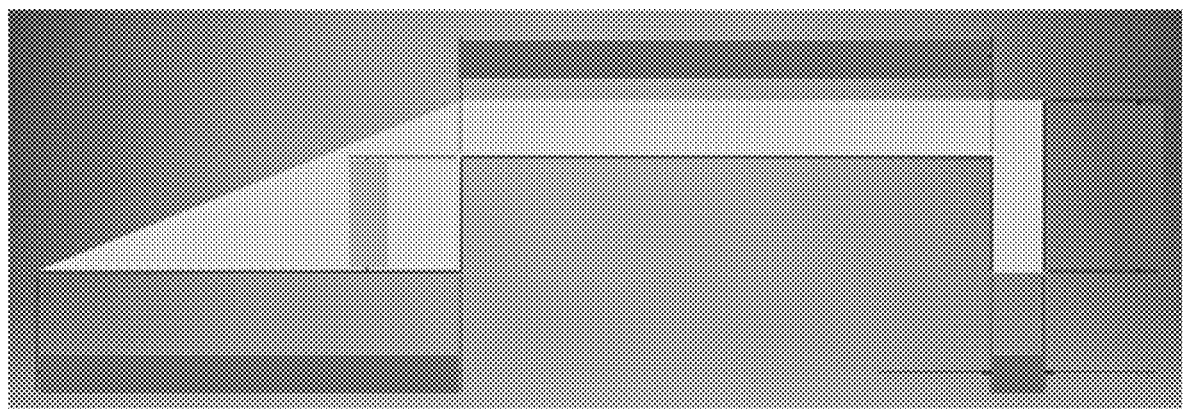
FIG. 8B shows an alternative view in elevation of a CAD model of the upper face of a device that sits flush against a panel or module surface.

FIG. 8B shows an alternative view in elevation of a CAD model of the upper face of a device that sits flush against a panel or module surface. In FIG. 8B the dimension callouts of the CAD drawing have been removed because drawings generally are shown not to scale. The features of the CAD models include smooth surfaces, fine tips, and structures to hold the device in place once installed.

The advantages of a design such as shown in FIG. 8A and FIG. 8B are that the device fits snugly against the solar panel, and the design is versatile. However, possible disadvantages may include that the lip does not adhere to a solar panel frame without silicone adhesive, which may cause limited lifetime with exposure to the elements (such as less than 25 years of service), and it may be time consuming and relatively expensive to implement on site.

Alternative Single Unit Embodiment

Figure 9A:
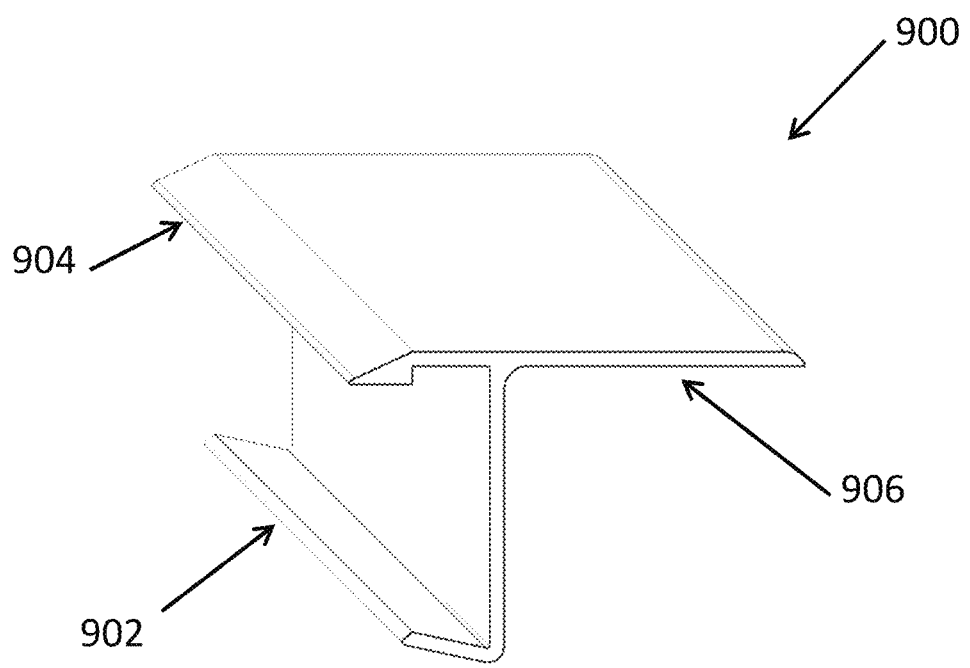
FIG. 9A shows a perspective view of a single-unit embodiment of the invention.

FIG. 9A shows a perspective view of a single-unit embodiment 900 of the invention. The single-unit embodiment of FIG. 9A comprises just one part that concurrently serves the roles of lower lip attachment and inter-panel connector if there are multiple panels, and can be used as a lower lip attachment at the lower edge of a panel nearest the ground.

In some embodiments, this unit can be attached to one PV module. In other embodiments, this unit is configured to fit within and to span the gap between two adjacent PV modules. The design incorporates a "clip" 902 and is not held in place by adhesive. The upper lip 904 of the part is meant to lie flush against both the upper and lower solar panel in an array. The part is meant to attach only to one panel at a time. If placed in between panels, the trailing surface 906 bridges the gap between adjacent upper and lower panels allowing the snow on the upper panel to overcome the step-like impediment of the upper frame and slide over the gap onto the lower panel and eventually off the lower panel. Examples of this embodiment have been fabricated using 3-D printing methods, and full length versions have been fabricated for testing using an extrusion manufacturing method.

This unit is versatile. This design allows one to retrofit any model solar panel by modifying dimensions. Altering these dimensions will ensure the part will fit the frame of any solar panel in need of a retrofit. For example, "Interpanel Retrofit 19" is intended to fit REC Twin Peak 335 W solar panels. It is also possible to adjust the extrusion length of the part. Because REC Twin Peak 335 W solar panels are 39.4" feet in width, the extruded part can be made to this length, for example by extruding longer units and cutting them to the desired dimension.

Figure 9B:
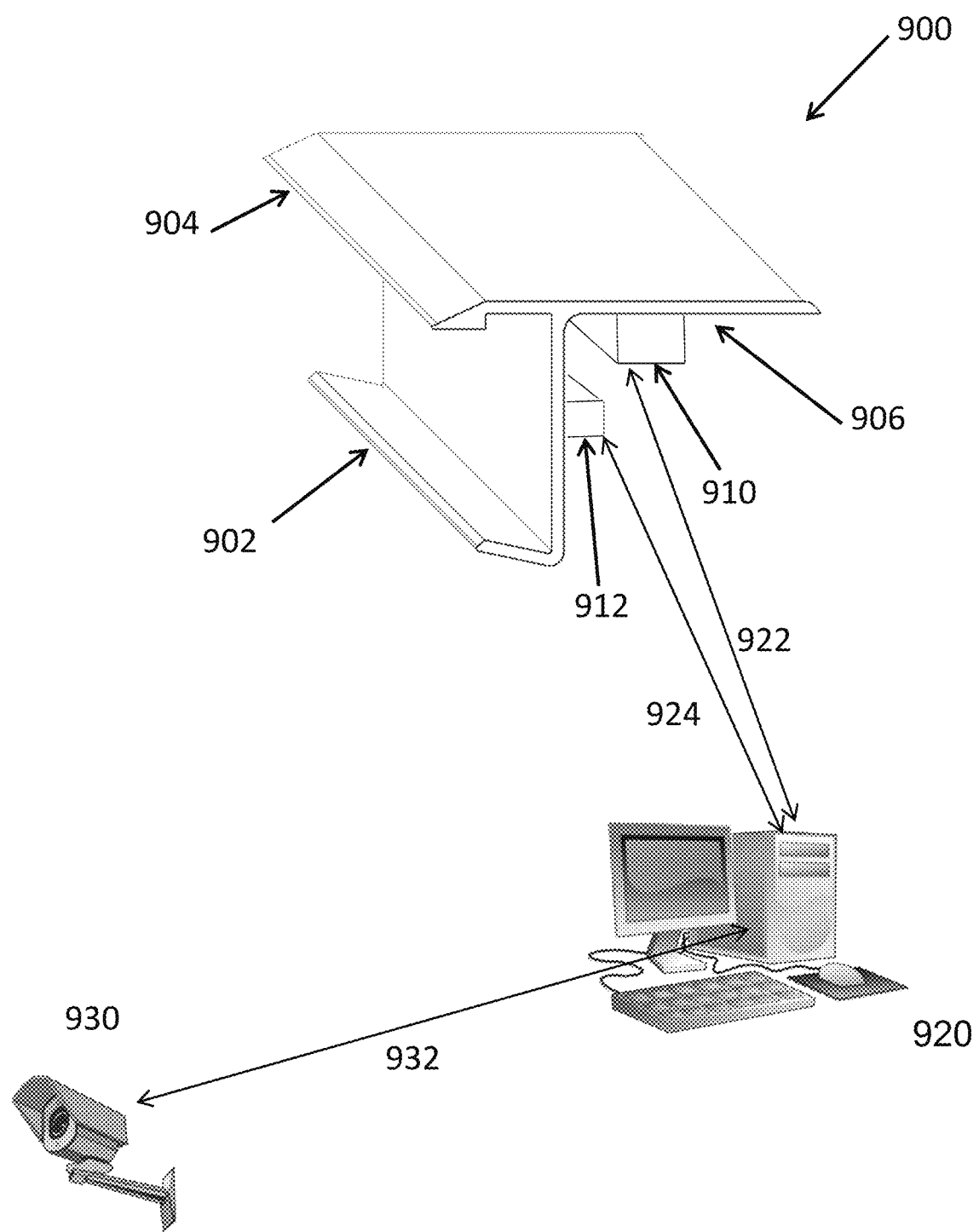
FIG. 9B shows a perspective view of a single-unit embodiment of the invention that includes a heating element and a mechanical vibration actuator.

FIG. 9B shows a perspective view of a single-unit embodiment of the invention that includes a heating element 910 and a mechanical vibration actuator 912. A general purpose programmable computer 920 that includes a non-volatile memory upon which can be recorded instructions in non-volatile format can communicate with the heating element 910 by way of a wired or wireless communication channel denoted by the bi-directional arrow 922, and can communicate with the mechanical vibration actuator 912 by way of a wired or wireless communication channel denoted by the bi-directional arrow 924.

In some embodiments, only one of the heating element 910 and the mechanical vibration actuator 912 are provided. In some embodiments, both of the heating element 910 and the mechanical vibration actuator 912 are provided. In some embodiments, the heating element and/or the mechanical vibration actuator can be provided in contact with a portion of a PV module and or in contact with a support structure of a PV module.

Monitoring System

In order to observe snow cover on solar arrays, we have set up time-lapse cameras which periodically take snapshots of the array and save them to a video file. It is too time consuming to analyze the snow cover of these images by hand, so we have developed a way to automate the process. Therefore, we created a set of encoded instructions (hereinafter a or the "computer program") recorded in nonvolatile memory accessible by a general purpose programmable computer that analyzes the video file to determine how much snow is covering the panels.

In FIG. 9B, there is also shown a camera 930 that can communicate bi-directionally with general purpose programmable computer 920 by way of a wired or a wireless communication channel denoted by bi-directional arrow 932. A monitoring system comprises at least one such camera. The camera 930 is oriented to provide an image of at least a portion of a PV array so that the presence or absence of snow can be observed.

The computer program, when operating on the general purpose programmable computer, for example general purpose programmable computer 920, controls the receipt and analysis of a video file containing the time-lapse images of the panel as input from an on-site monitoring station.

The general purpose programmable computer on which the computer program (or "image analysis algorithm") is operating analyzes the video in three steps.

1. First, it breaks video file into a series of images of the solar panel.
2. Next, the program analyzes the sequence of images to determine the percentage of snow covering each panel.
3. Lastly, it outputs data representing the snow cover at various points in time into a computer spreadsheet program such as an Excel spreadsheet.

Step 1 of the Image Analysis Algorithm

A reference image photographed under clear weather conditions is used for initial calibration, in which the algorithm selects a panel that is not covered in snow to use as a benchmark panel. The algorithm searches the image for markers indicating the edge of the panels. Edge analysis in processing optical images is known in the relevant art. Using the location of these markers, the program determines the geometry of the panel and stores it in non-volatile memory for future use.

Figure 10A:
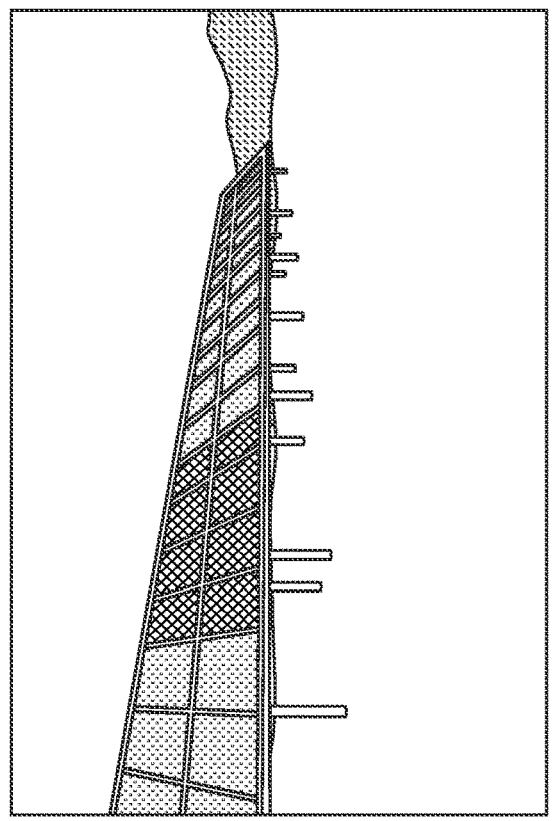
FIG. 10A and FIG. 10B illustrate how the image of an PV installation is captured and analyzed.
Figure 10B:
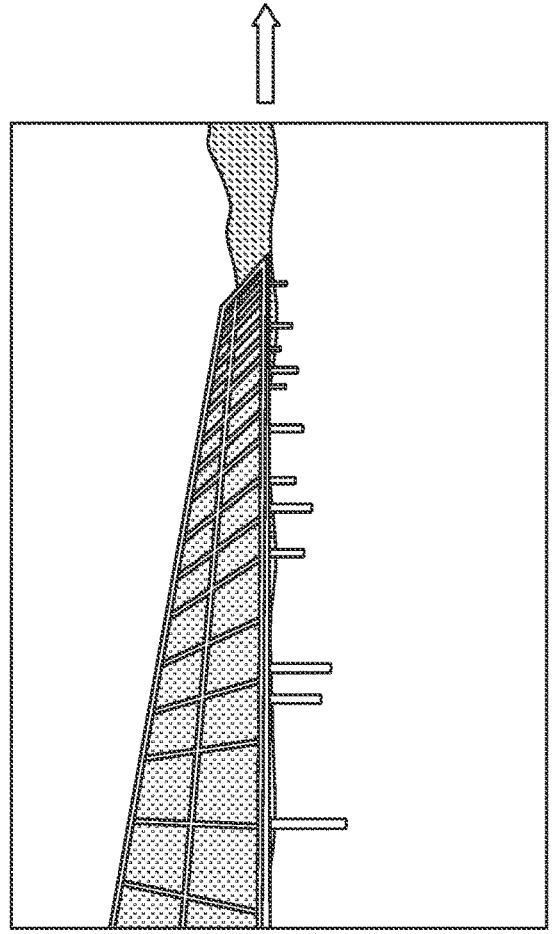

FIG. 10A and FIG. 10B illustrate how the image of a PV installation is captured and analyzed.

FIG. 10A is an image as captured and recorded by the image analysis system.

FIG. 10B is an image in which a number of PV panels with snow cover (shown in lighter shade) have been identified.

Step 2 of the Image Analysis Algorithm

After determining the geometry of the reference panel, the program will compare it to each of the other images generated by the time-lapse camera. For each image, the program compares the colors of pixels within the panel's geometry. If a pixel was dark in the image of the reference panel but has changed to white in another image, then there must be snow on that pixel. We determine the total snow cover on the panel by counting the number of pixels or net area that have changed to white compared to the total pixels or net area within the panel.

Figure 11:
FIG. 11 is a screenshot of the display of a general purpose programmable computer in which a series of images are displayed, some of which show snow cover on the PV panels.

FIG. 11 is a screenshot of the display of a general purpose programmable computer in which a series of images are displayed, some of which show snow cover on the PV panels.

Step 3 of the Image Analysis Algorithm

In order to determine if a pixel is bright enough to be considered snow, we must also account for the fact that different images have varying levels of brightness. To determine how bright an image is, we compare the brightness of the metal strips in the image to the reference image. Since snow has similar brightness to the metal strip, we determine a pixel to be snow if its brightness is similar to that of the metal strip.

Figure 12B:
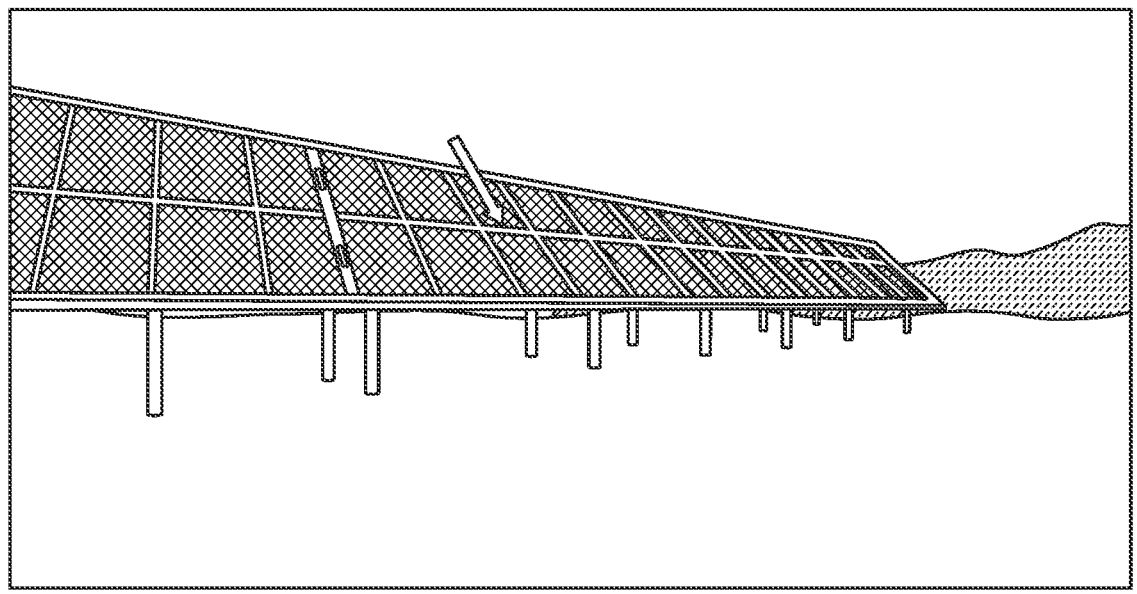

FIG. 12 A and FIG. 12B are captured images of PV panels, in which the arrow points to the metal strip at the edge of the PV panel.

Figure 12C:
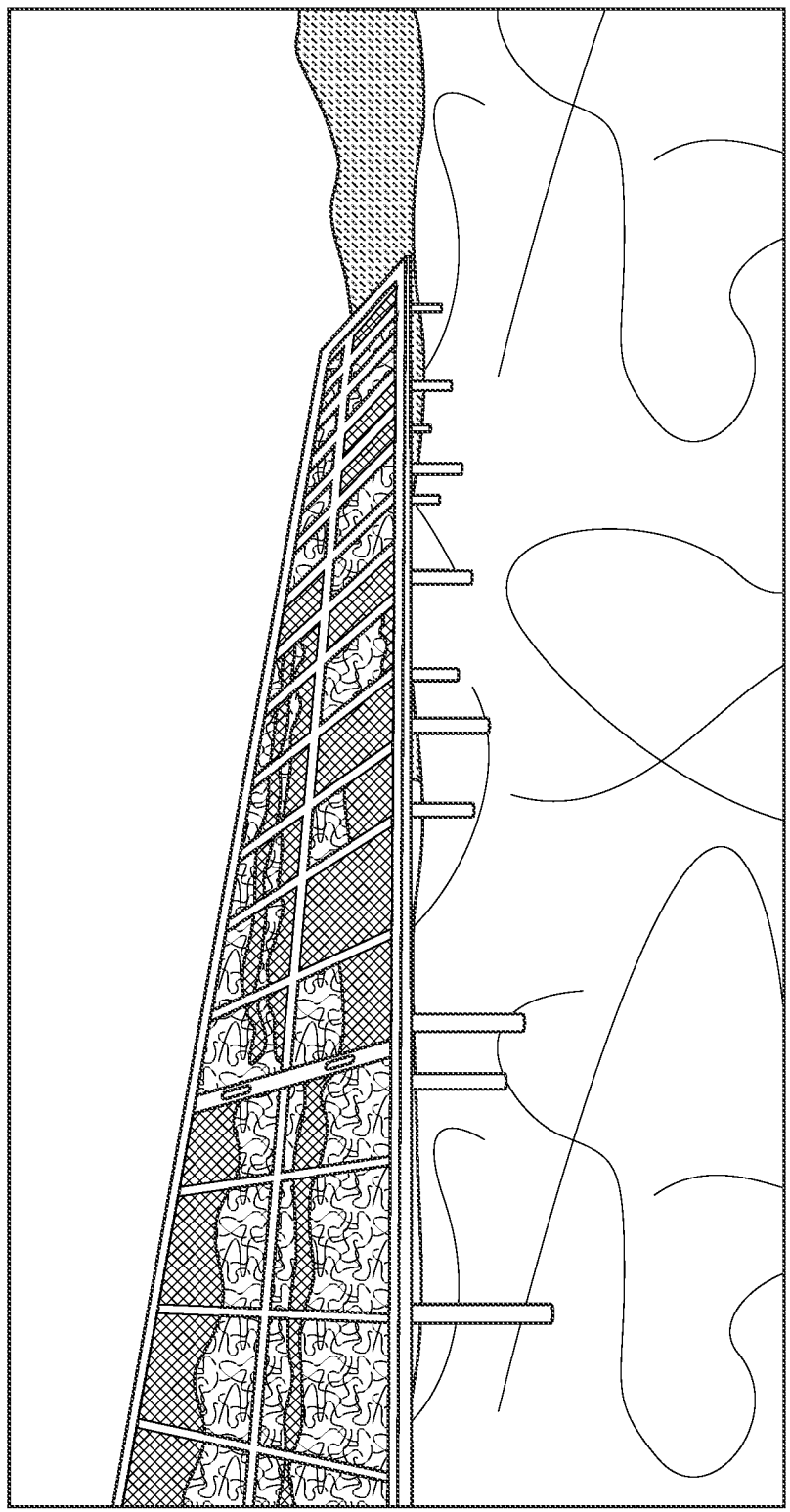

FIG. 12C is an image of PV panels showing some panels covered partially or entirely by snow, and some panels not covered by snow.

The Program Output

After analyzing the snowfall, the program creates a file listing the timestamps of the images and the extent to which they are covered in snow. Optionally, the program can also generate modified images which provide a visual representation of the image processing that the algorithm performed.

Figure 13:
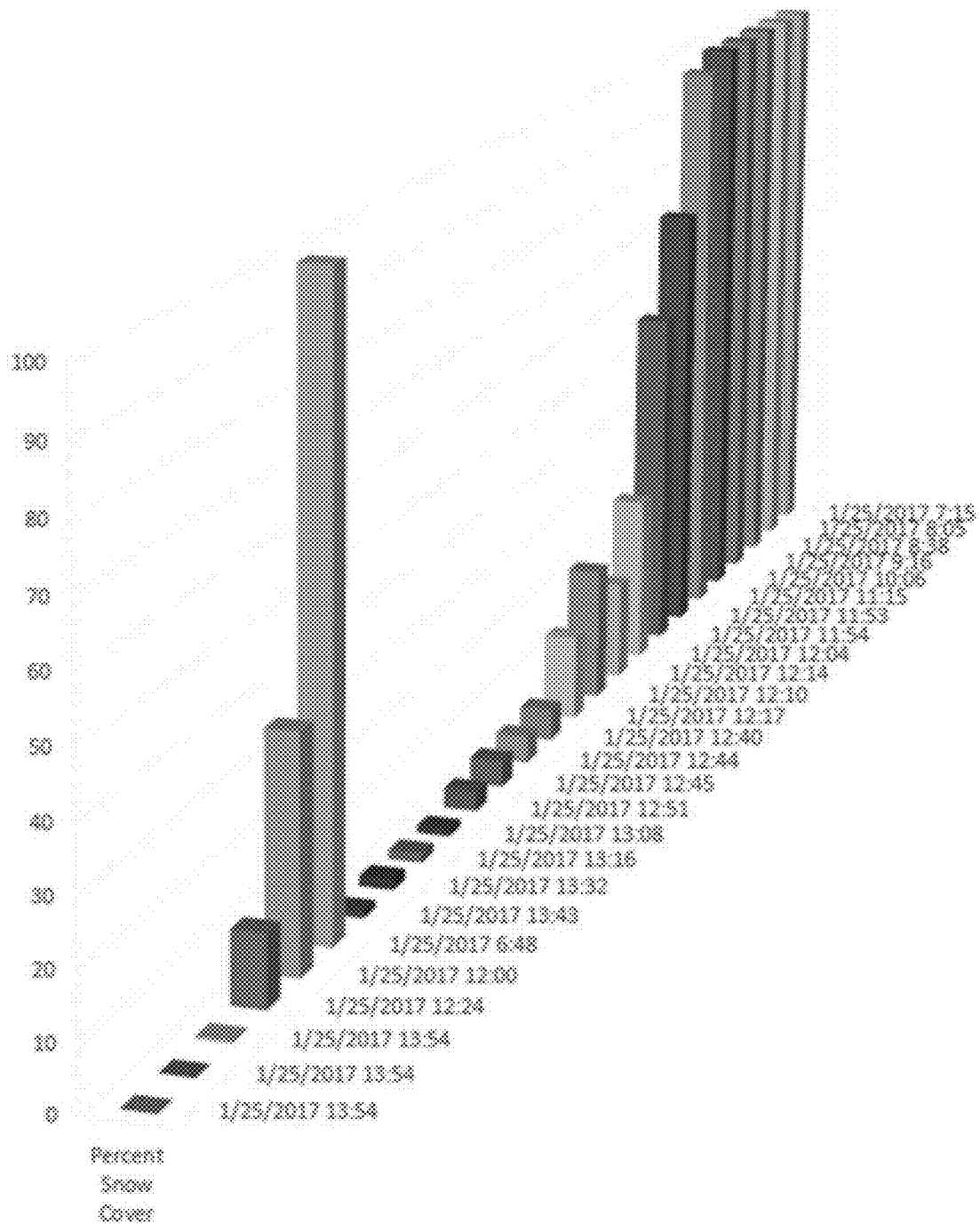
FIG. 13 is a display of the percentage of a PV installation covered by snow as a function of time on Jan. 25, 2017.

FIG. 13 is a display of the percentage of a PV installation covered by snow as a function of time on Jan. 25, 2017.

Deliberate Snow Removal Elements

Surface Treatment

In some embodiments, the system can further include as a deliberate snow removal element a surface treatment or modification that aids or promotes the shedding of snow. The surface treatment can be applied to any surface which is expected to be covered by snow. If applied to the surface of a PV module, such surface treatments are preferably transparent in the range of wavelengths extending from the near infrared and shorter wavelengths, so as not to impede the light falling on the PV module from being absorbed or reflected, and are preferably such that any warranty of the manufacturer is not voided. Surface treatments such as a very thin, ideally mono-molecular thick layer of a material, can be used. In some embodiments, the material can be a hydrophilic material or surface treatment that allows water to wet the surface and to wick away under gravitational forces. In some embodiments, the material can be a hydrophobic material or surface treatment that prevents water from wetting the surface and allows it to slide away under gravitational forces. An example of a transparent, hydrophobic material is described in S. Pan et al., Coatings super-repellent to ultralow surface tension liquids, Nature Materials, published 15 Oct. 2018.

Heating Elements

In some embodiments, the system can further include as a deliberate snow removal element a heating element, such as an electrical heating tape, that can cause snow to begin to melt, so as to enhance snow shedding behavior.

Mechanical Vibration Actuator

In some embodiments, the system can further include as a deliberate snow removal element a mechanical vibration actuator, such as an electrical to mechanical transducer (e.g., a device analogous to an audio speaker, an ultrasonic transducer), or a mechanical tapping structure (such as a linear motor oriented in such a direction that a shaft of the linear motor can impact the PV module, for example on a rear surface), which can institute vibrations in the snow on the PV module and thereby cause it to "avalanche" off the PV module. In some embodiments, the linear motor can be a linear stepper motor. Stepper motors can be operated with very high mechanical precision and with variable frequency, by driving the stepper motor with a digital controller or a general purpose programmable computer.

In some embodiments, a single installed PV power system can include a combination of any two or more of the deliberate snow removal element, such as a surface treatment, a heating element, and a mechanical vibration actuator in combination.

Operation of the Monitoring System

In some embodiments, one can use the monitoring system to determine that there is snow coverage on some or all of an installed PV array or PV power system. In the event that the snow coverage is present when the system is being illuminated, one can direct a general purpose programmable computer to control the operation of the deliberate snow removal elements (e.g., the heating element or elements, and/or the mechanical vibration actuator or actuators) to operate so as to cause some or all of the snow cover to be removed, for example by melting and/or by sliding off). The monitoring system can be used to observe the array, and to determine when the snow has been removed, at which time the general purpose programmable computer can cause the operation of the deliberate snow removal elements to cease when they are no longer needed to cause snow to be removed.

Definitions

In this document, the terms "PV panel" and "PV module" are used interchangeably. In general, the terms "PV panel" and "PV module" denote a structure that comprises a plurality of PV cells which are electrically interconnected and encapsulated in a frame having a transparent front surface configured to admit light (for example ambient sunlight), and which is hermetically sealed to prevent degradation of the PV cells and having external electrical connectors that allow the panel to provide electrical power to a load when illuminated.

Any reference in the claims to an electronic signal or an electromagnetic signal (or their equivalents) is to be understood that in a preferred embodiment the signal is a non-transitory electronic signal or a non-transitory electromagnetic signal. If the signal per se is not claimed, the reference may in some instances be to a description of a propagating or transitory electronic signal or electromagnetic signal.

In general, the term "computer program" (or the term "program" when used with regard to a computer) refers to a set of encoded instructions recorded in nonvolatile memory accessible by a general purpose programmable computer, or to the set of instructions when they are operating on a general purpose programmable computer.

Recording the results from an operation or data acquisition, such as for example, recording results at a particular frequency or wavelength is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use, so that the result can be displayed, recorded to a non-volatile memory, or used in further data processing or analysis.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawings, it will be understood by one skilled in the art that various changes in detail may be effected therein without departing from the spirit and scope of the invention as defined by the claims.

What is claimed is:

1. A device, comprising:
    at least one photovoltaic (PV) module comprising a plurality of PV cells which are electrically interconnected and encapsulated in a frame having a transparent front surface configured to admit light, said frame representing an impediment to the sliding of snow on said transparent front face; and
    a structure configured to be attached to said at least one PV module,
    said structure comprising an element that covers said frame of said at least one PV module and extends from said frame of said at least one PV module onto said transparent front surface of said at least one PV module, said element having a first surface that sits flush against said transparent front surface, and a second surface being disposed at an acute angle relative to said transparent front surface without either of said first surface and said second surface covering any of the PV cells in said PV module
    said structure configured to allow snow on said transparent front surface to slide off said at least one PV module.

2. The device of claim 1, wherein said structure configured to be attached to said at least one photovoltaic (PV) module is further configured to bridge a gap between said at least one PV module and a second PV module installed adjacent to said at least one PV module.

3. The device of claim 1, wherein said structure is configured to allow manual attachment of said structure to said at least one PV module.

4. The device of claim 1, wherein said structure comprises a snap-on attachment mechanism.

5. The device of claim 1, wherein said impediment comprises a difference in height of said frame relative to said transparent front surface of said at least one PV module.

6. A system for mitigating snow cover on a PV array, comprising:
    the device of claim 1, and
    further comprising a deliberate snow removal element as an additional element, said deliberate snow removal element configured to promote the shedding of snow.

7. The system of claim 6, wherein said deliberate snow removal element is at least one of a surface treatment applied to the device, a surface treatment applied to said transparent front surface of said at least one PV module, a heater and a mechanical vibration actuator.

* * * * *